United States Patent [19]
Tallent

[11] 3,976,775
[45] Aug. 24, 1976

[54] METHOD FOR DISSOLVING PLUTONIUM DIOXIDE

[75] Inventor: Othar K. Tallent, Oak Ridge, Tenn.

[73] Assignee: The United States of America as represented by the United States Energy Research and Development Administration, Washington, D.C.

[22] Filed: May 6, 1975

[21] Appl. No.: 574,977

[52] U.S. Cl............................ 423/251; 252/301.1 R; 423/3
[51] Int. Cl.².............................................. B01F 1/00
[58] Field of Search .................... 423/251, 20, 3, 4; 252/301.1 R

[56] References Cited
UNITED STATES PATENTS

| 3,208,817 | 9/1965 | Jenkins............................... 423/251 |
| 3,259,473 | 7/1966 | Hopkins.............................. 423/251 |

*Primary Examiner*—Richard E. Schafer
*Attorney, Agent, or Firm*—Dean E. Carlson; David S. Zachry; Allen H. Uzzell

[57] ABSTRACT

A method for dissolving plutonium dioxide comprises adding silver ions to a nitric acid-hydrofluoric acid solution to significantly speed up dissolution of difficultly soluble plutonium dioxide.

1 Claim, 3 Drawing Figures

METHOD FOR DISSOLVING PLUTONIUM DIOXIDE

BACKGROUND OF THE INVENTION

This invention was made in the course of, or under, a contract with the Energy Research and Development Administration.

The present invention relates generally to the dissolution of plutonium dioxide for nuclear fuel reprocessing, and more specifically to the nitric acid dissolution of plutonium dioxide catalyzed by hydrofluoric acid.

One of the commonly used nuclear fuels is plutonium in the form of the dioxide. The dioxide is suitable for use in nuclear fuel because of its refractivity and its inert nature. For nuclear fuel applications, $PuO_2$ is generally mixed with $UO_2$ in compositions of 15–30% $PuO_2$. In nuclear reactors, particularly the breeder type reactor, the spent fuel is periodically removed and reprocessed to separate the waste materials from the useful products. Methods are available for recovering and purifying plutonium once the material is dissolved in an aqueous nitrate solution. However, $PuO_2$ is relatively difficult to dissolve in pure concentrated nitric acid.

The difficulty of dissolution depends upon the fuel manufacturing process. Fuels experiencing high sintering temperatures resulting in solid solution of the mixed oxides are soluble in 10–12 M nitric acid. Mechanically blended fuels of high $PuO_2$ content which, having been sintered at relatively lower temperature, contain separate $PuO_2$ and $UO_2$ phases are difficultly soluble in 10–12 M nitric acid. Preferential dissolution of $UO_2$ usually occurs in these fuels leaving difficultly soluble residues of high $PuO_2$ content. In addition, certain forms of $PuO_2$ which have been fired at very high temperatures to obtain maximum density, such as microspheres having 96–98% theoretical density, are slow to dissolve by any known means. The subject invention is particularly applicable to the dissolution of such difficultly soluble $PuO_2$.

In the prior art, a certain degree of success in dissolving difficultly soluble $PuO_2$ has been obtained. U.S. Pat. No. 3,005,682 discloses a dissolution process in which catalytic amounts of cerium ions (strong oxidizing agents) are added to a concentrated nitric acid solution to aid $PuO_2$ dissolution. The addition of cerium ions aids in the oxidative dissolution of $PuO_2$ since $PuO_2$ is oxidized to the soluble plutonyl ion, $PuO_2^{+2}$.

Another prior art process involves the addition of fluoride ions, i.e., HF, to a concentrated nitric acid solution to aid $PuO_2$ dissolution. This is an essentially non-oxidative dissolution since the Pu goes into solution by the formation of a soluble $PuF^{+3}$ complex ion. Residues resulting from the partial dissolution of mixed $UO_2$-$PuO_2$ fuels in 8 M $HNO_3$ can usually be dissolved in 8–10 M nitric acid to which HF has been added. In some cases, however, long times of digestion are required and almost stoichiometric quantities of fluoride ion are consumed. Frequently, small residues of $PuO_2$ remain undissolved even with the use of stoichiometric quantities of HF and digestion.

SUMMARY OF THE INVENTION

It is an object of the present invention to provide a method for dissolving $PuO_2$ in nitric acid whereby dissolution is substantially complete.

It is a further object to provide a method for increasing the rate of dissolution of $PuO_2$ in a mixed nitric-hydrofluoric acid.

It is a further object to reduce the fluoride concentration of the dissolving solution, thereby reducing the corrosiveness of the solution.

It is a further object to partially reduce or eliminate the consumption of HF during the dissolution of $PuO_2$ in mixed nitric-hydrofluoric acid.

These and other objects are accomplished by providing a method for bringing $PuO_2$ into aqueous solution comprising adding a silver compound to an aqueous dissolving mixture comprising $PuO_2$, $HNO_3$ and an effective catalytic amount of fluoride, the silver compound being soluble in the dissolving solution and supplying silver ions of oxidation state greater than I.

DETAILED DESCRIPTION

When HF is added to a nitric acid-$PuO_2$ mixture, dissolution of $PuO_2$ occurs by the formation of the soluble complex ion $PuF^{+3}$. This ion is relatively stable, so a substantially stoichiometric quantity of the fluoride ion is required to dissolve $PuO_2$. Consequently, the rate of dissolution of $PuO_2$ decreases as the $F^{-1}$ ions become tied up in the complex.

EXAMPLE I

Figure 1:
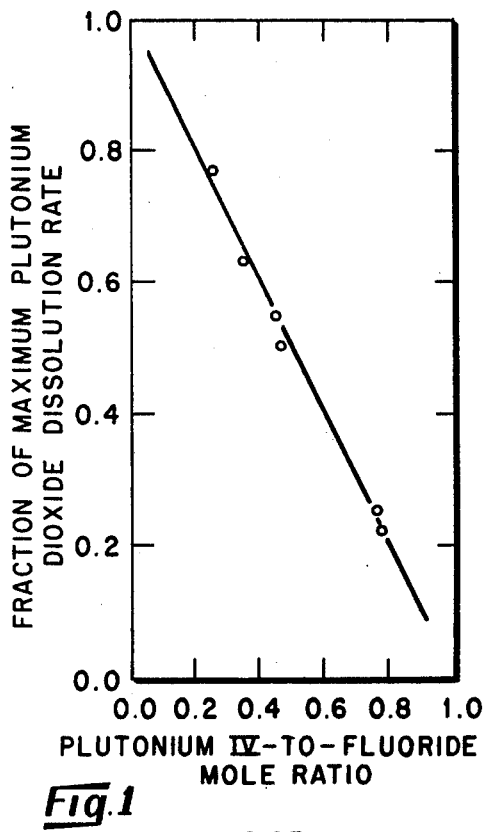
FIG. 1 is a graph of $PuO_2$ dissolution rate v. PuIV/F mole ratio showing the decrease in dissolution rate as dissolved PuIV concentration increases.

One half gram of $PuO_2$ microspheres of a refractory, difficultly-soluble type (about 98% theoretical density) was digested at 100°C. in a teflon container in 30 ml of a solution 10 M in $HNO_3$ and 0.02 M in HF. The data are shown in FIG. 1 wherein the fraction of maximum dissolution rate is plotted versus PuIV/$F^{-1}$ mole ratio. The PuIV/F ratio represents the concentration of dissolved PuIV with respect to initial $F^{-1}$ ion concentration. The resulting curve has a slope of minus one and shows that the decrease in dissolution rate is directly proportional to the increase in PuIV/$F^{-1}$ mole ratio. Projection of the curve indicates that the dissolution rate would be greatest for zero dissolved PuIV concentration and that the rate would decrease to zero at a PuIV/$F^{-1}$ mole ratio of one. However, other experiments showed that, although the dissolution becomes very slow, it does not diminish to zero. This can be accounted for by assuming that the $(PuF)^{+3}$ complex ion does release a small concentration of fluoride ion.

EXAMPLE II

Figure 2:
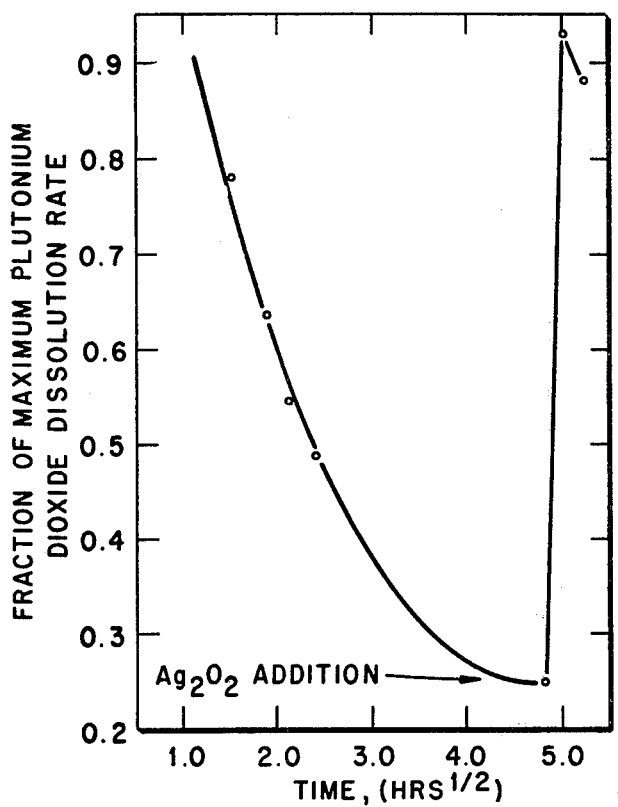
FIG. 2 is a graph of $PuO_2$ dissolution rate v. time showing the effect of $Ag_2O_2$ addition.

The increased dissolution rate of $PuO_2$ as a result of the addition of $Ag_2O_2$ was demonstrated by the following experiment graphically depicted in FIG. 2. One half gram of refractory $PuO_2$ microspheres was digested at 100°C. in teflon equipment in 30 ml of 10 M $HNO_3$ — 0.02 M HF solution. The initial dissolution rate for the sample was approximately $10.4 \times 10^{-4}$ moles per liter, per hour. At the end of 24 hours enough plutonium had dissolved to provide a PuIV/$F^{-1}$ ratio of 0.75. The dissolution rate had then decreased to about one-fourth the initial rate. At this point 0.50 gram of silver oxide was added to the solution. Oxidative dissolution of the plutonium occurred during the next three hours as evidenced by analysis for PuIV and PuVI. The mole ratio of PuIV in solution to initial fluoride decreased to 0.25 and the dissolution rate increased to greater than 85 percent of the initial rate.

EXAMPLE III

One-half gram samples of refractory $PuO_2$ microspheres were digested at 100°C. in teflon equipment in 40 ml volumes of 8 M $HNO_3$ — 72 0.02 M HF solution with and without $Ag_2O_2$ addition. The date in the table show that in 174 hours of dissolution in 8 M $HNO_3$ — 0.02 M HF there is 51.0% more total plutonium dissolved with $Ag_2O_2$ addition than without the addition. The data in the table show also that the dissolution with $Ag_2O_2$ results in large fractions of the dissolved plutonium being oxidized to the plutonyl ($PuO_2^{+2}$) state.

Effect of $Ag_2O_2$ Addition" on Plutonium Dissolution in 8 M $HNO_3$ — 0.02 M HF Dissolvents at 100°C.

| Time (hr) | Percentage Increase in $PuO_2^{+2}$ Concentration Resulting from $Ag_2O_2$ Addition | Percentage Increase in Total Pu Concentration Resulting from $Ag_2O_2$ Addition |
|---|---|---|
| 51 | 65.5 | 8.0 |
| 75 | 204.3 | 10.1 |
| 129 | 247.8 | 28.7 |
| 174 | 325.0 | 51.0 |

"Added 100 mg of $Ag_2O_2$ every 24 hours.

Figure 3:
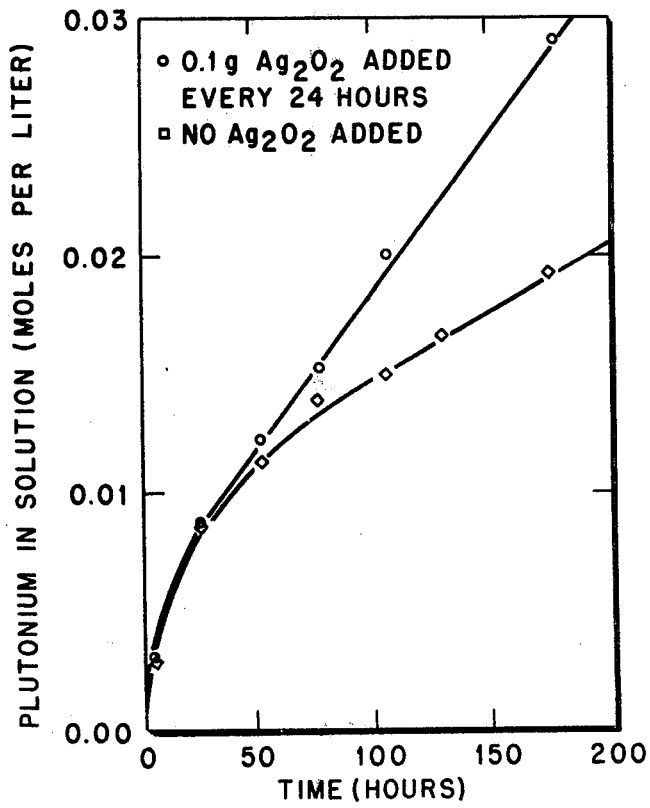
FIG. 3 is a graph of total plutonium ion concentration in solution v. time for solutions with and without periodic $Ag_2O_2$ addition.

The increased plutonium dissolution rates resulting from the $Ag_2O_2$ additions can be seen in FIG. 3 where plutonium concentrations in the dissolvents are plotted as a function of dissolution time for dissolutions with and without $Ag_2O_2$ additions. The curves in the FIG. 3 show that the initial dissolution rates are the same with and without $Ag_2O_2$ additions but that the rate without $Ag_2O_2$ addition decreases much faster than does the rate with $Ag_2O_2$ addition.

It is not fully understood how the addition of $Ag_2O_2$ enhances the dissolution. In the prior art, oxidation agents have not been known to enhance the essentially non-oxidative dissolution of $PuO_2$ in mixed nitrichydrofluoric acid. More particularly, the addition of sodium dichromate, a strong oxidizing agent, to a dissolving mixture of refractory $PuO_2$ microspheres (about 98% theoretical density) in 8 M $HNO_3$ — 0.02 M HF oxidized the Pu already in solution to $PuO_2^{+2}$ but did not increase the dissolution rate of $PuO_2$. Similarly, the addition of CeIV ions, as in the prior art, to a similar dissolving solution not only did not cause complete dissolution of the microspheres, but actually retarded the $PuO_2$ dissolution rate. It has also been found that silver ions in the I oxidation state, when added as $AgNO_3$, do not enhance $PuO_2$ dissolution.

When $Ag_2O_2$ is dissolved in nitric acid, silver ions in the II and III oxidation state are available. While I do not intend the invention to be limited by any theoretical explanation, it is believed that this silver, in an oxidation state greater than I, both catalyzes the dissolution and oxidizes the soluble $PuF^{+3}$ complex ion to the soluble $PuO_2^{+2}$ ion, thereby releasing the $F^-$ from the complex for further non-oxidative dissolution. The fluoride ion now behaves as a true catalyst rather than being consumed in the dissolution process.

According to the present invention the dissolution rate of $PuO_2$ may now be enhanced by the addition of $Ag_2O_2$ to the mixed $HNO_3$-HF dissolving solution. While dissolution of some forms of $PuO_2$ may be carried out without $Ag_2O_2$ addition, the rate of dissolution of difficultly soluble $PuO_2$ is significantly enhanced by addition of substantially stoichiometric amounts of $Ag_2O_2$ with respect to the oxidation of PuIV to PuVI. Exactly stoichiometric amounts are not required since some PuIV to PuVI oxidation is caused by the nitric acid. Alternately, the high oxidation states of the silver ion may be maintained by reoxidation, i.e., by electrolytic oxidation, greatly reducing the requirement for $Ag_2O_2$.

While various concentrations of nitric acid are used to dissolve various types of $PuO_2$ and mixed $PuO_2$-$UO_2$ fuels, the present invention has particular value for dissolving those difficultly soluble residues or microspheres that have heretofore been soluble only in 6–16 M $HNO_3$ mixed with substantially stoichiometric amounts of HF. The addition of $Ag_2O_2$ prevents the consumption of the fluoride ion thereby preventing the decline in dissolution rate as Pu goes into solution.

According to the present invention, HF is no longer required in stoichiometric amounts with respect to Pu. While the rate of dissolution may be increased by adding greater amounts of fluoride, all that is required for dissolution is an effective catalytic amount, since the fluoride ion is now returned to the solution rather than being tied up in the $PuF^{+3}$ complex ion. An effective catalytic amount is that amount, independent of Pu stoichiometry, which will effectively catalyze the $PuO_2$ dissolution for the particular $HNO_3$ concentration and may be routinely determined for the desired application. According to the present invention, the necessary fluoride ion concentration may now be reduced to less than 0.01 M to suit the corrosion resistance of the dissolving vessel.

What is claimed is:

1. A method of bringing $PuO_2$ into aqueous solution comprising adding $Ag_2O_2$ to an aqueous dissolving mixture comprising $PuO_2$, $HNO_3$, and an effective catalytic amount of fluoride.

* * * * *